(12) United States Patent
Watzek et al.

(10) Patent No.: US 11,384,826 B2
(45) Date of Patent: Jul. 12, 2022

(54) MULTI-COMPONENT GEAR

(71) Applicant: Johnson Electric International AG, Murten (CH)

(72) Inventors: Michael Watzek, Courgevaux (CH); Daniel Riedo, Gurmels (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 159 days.

(21) Appl. No.: 16/747,461

(22) Filed: Jan. 20, 2020

(65) Prior Publication Data
US 2020/0240502 A1    Jul. 30, 2020

(30) Foreign Application Priority Data

Jan. 30, 2019   (GB) ..................................... 1901301

(51) Int. Cl.
*F16H 55/06*   (2006.01)
*F16H 57/00*   (2012.01)
*F16H 57/032*  (2012.01)

(52) U.S. Cl.
CPC ......... *F16H 55/06* (2013.01); *F16H 57/0006* (2013.01); *F16H 57/032* (2013.01); *F16H 2055/065* (2013.01)

(58) Field of Classification Search
CPC ........................... F16H 55/06; F16H 2055/065
See application file for complete search history.

(56) References Cited

U.S. PATENT DOCUMENTS

| 7,661,333 | B2 * | 2/2010 | Watanabe | F16H 55/17 |
| | | | | 74/444 |
| 2015/0308555 | A1 | 10/2015 | Oberle et al. | |
| 2017/0225374 | A1 * | 8/2017 | Brochot | B29C 45/1657 |
| 2019/0040941 | A1 * | 2/2019 | Kiyota | F16H 1/16 |
| 2020/0217410 | A1 * | 7/2020 | Yamaguchi | F16H 57/032 |
| 2021/0062905 | A1 * | 3/2021 | Nakayama | B29C 45/14491 |
| 2021/0162639 | A1 * | 6/2021 | Fujinaka | B29C 45/16 |
| 2021/0180675 | A1 * | 6/2021 | Bartolomeo | C25D 3/562 |

FOREIGN PATENT DOCUMENTS

| CN | 205260764 U | 5/2016 | |
| DE | 102014217012 A1 * | 3/2015 | ............. F16H 55/06 |

OTHER PUBLICATIONS

Search report dated Jul. 8, 2019 in connection with GB application No. GB1901301.0.
English abstract of Chinese utility application No. CN205260764.

* cited by examiner

*Primary Examiner* — Terence Boes
(74) *Attorney, Agent, or Firm* — Aird & McBurney LP

(57) ABSTRACT

A multi-component gear for an actuator is provided. The gear includes a first gear portion having an engagement head and a gear stem axially extending from the engagement head, and a second gear portion having a gear body which includes a plurality of gear teeth at a circumference thereof, the gear body being received around the engagement head of the first gear portion. The first gear portion is formed from a first material and the second gear portion is formed from a second material which has a lower dynamic hardness than the first material.

20 Claims, 4 Drawing Sheets

MULTI-COMPONENT GEAR

CROSS REFERENCE TO RELATED APPLICATIONS

This non-provisional patent application claims priority under 35 U.S.C. § 119(a) from Patent Application No. 1901301.0 filed in United Kingdom on Jan. 30, 2019.

FIELD

The present invention relates to a multi-component gear, particularly but not necessarily for use in actuator systems such as those found in automotive applications. The invention further relates to a method of manufacturing such a multi-component gear.

BACKGROUND

In actuator assemblies, a gear train is provided to transfer drive from the motor to an output of the actuator, such as a drive shaft. The impact between the teeth of intermeshing gears creates acoustic noise. Unfortunately, gears which are more robust and resistant to wear and breaking are also likely to be harder and create more noise on contact with other gears. As such, there are two conflicting requirements: reduced noise of operation; and robustness of the gear train.

The first gear stage in an actuator is the most important for noise requirements, since it is the one which rotates at the highest speed. At the same time, the pinion of the first gear is subject to a higher torque due to the reduction from the first to the second stage. A harder material is therefore preferred for the pinion than for the gear teeth of the wheel.

At present, there are two options which are used in the art. A compromise material could be chosen, for example, a plastics material having a medium softness. Optionally, such a material may be loaded with glass fibres to prevent the gears from breaking under the load. Such glass fibres are, however, abrasive, and may have the resultant effect of increasing wear.

An alternative is to choose a high-performance material which is both low-noise and low-wear. Such materials are comparatively expensive, and therefore are prohibitive for use in mass-manufacture of actuators.

SUMMARY

The present invention seeks to provide a low-noise and low-wear gear which can be manufactured cost-effectively to provide an improved gear train for an actuator.

According to a first aspect of the invention, there is provided a multi-component gear for an actuator, the gear comprising: a first gear portion having an engagement head and a gear stem axially extending from the engagement head; and a second gear portion having a gear body which includes a plurality of gear teeth at a circumference thereof, the gear body being received around the engagement head of the first gear portion; wherein the first gear portion is formed from a first material, and the second gear portion is formed from a second material which has a lower dynamic hardness than the first material.

By altering the material compositions of the two gear portions so that the central portion has a large dynamic hardness and the outer portion has a relatively low dynamic hardness, a noise reduction can be achieved for the gear wheel without compromising the strength of the drive shaft, to which there will typically be mounted a pinion.

Preferably, the first gear portion may include a pinion gear on the gear stem. Optionally, the pinion gear may be integrally formed with the gear stem.

A pinion needs to be strong and resistant to wear, since it turns at a slower speed but experiences a higher torque than the gear wheel. As such, a unitarily formed central pinion gear as part of the first gear portion significantly improves the wear-resistance of the multi-component gear.

A perimeter interface of the engagement head may preferably be non-circular.

To prevent dephasing of the first and second gear portions during rotation of the gear, it is preferred that an interface therebetween not be circular, instead, having a shape which ensures locking between the first and second gear portions during rotational motion.

Optionally, the perimeter interface may comprise a plurality of radially-extending members which are engagable with the body of the second gear portion.

Radially extending members may improve the overall strength of the multi-component gear, providing reinforcement to the softer material of the second gear portion without interfering with the noise-dampening capabilities thereof.

The perimeter interface may include at least one recess engagable with the body of the second gear portion.

Recesses can add to the non-uniformity of the engagement head, allowing overmolded material to fill the recesses and engage more effectively with the first gear portion.

The perimeter interface may have a non-uniform cross-section along an axial direction of the gear. Optionally, this may be a V- or U-shaped cross-section along the axial direction of the gear.

The use of a projecting portion at the perimeter interface enables an axial lock between the first and second gear portions to be created. As such a strong, optionally non-chemical, bond can be established between the components by the use of overmolding, which is a simple manufacturing process. This is particularly important where materials are used which may not be otherwise suitable for chemical bonding.

Preferably, the first material may be a plastics material, and the second material may be a different plastics material.

The use of plastics materials may simplify the manufacturing process, where an overmolding process is preferred, may result in a reduced weight of actuator, and may also be more cost-effective to manufacture than, for example, metal gear components.

The first material may have a static Shore B hardness of at least 60, examples of which may be a polyamide or polyoxymethylene.

The second material may have a static Shore A hardness of at least 30 and less than 90, for example, a thermoplastic elastomeric material.

Whilst the dynamic or rebound hardness is the important material characteristic for the first and second gear portions, there is a correlation between static hardness and dynamic hardness which can be used to influence the material choice for the multi-component gear.

In one embodiment, the engagement head may comprise both axial and radial retaining means for engaging with the second gear portion.

The provision of both axial and radial retaining means in the multi-component gear drastically reduces the likelihood of failure of the gear during use by dislocation of the gear portions.

Optionally, the multi-component gear may be a spur gear.

A spur gear, having linear teeth, may be the most readily and cost-effectively formed gear type via an overmolding procedure, and therefore suitable for creation of a gear train for an actuator.

The engagement head of the first gear portion may include at least one axial member engagable with the second gear portion.

An axial member which engages with the second gear portion helps to prevent axial disassembly during operation, which has been found to be a problem during testing.

The at least one axial member may project from the engagement head.

An advantage of projecting axial members is that they can interface with the mold within which the overmolding occurs. In doing so, the projecting legs or supports can advantageously locate the pinion correctly within the mold, ensuring a greater uniformity of manufacture. The legs can ensure that the engagement head is not tilted in the mold, and that an adequate gap is provided both top and bottom around the engagement head for polymer resin to flow.

Additionally, or alternatively, the at least one axial member may be formed as a recess in the engagement head.

A recess in the engagement head can similarly act to stabilise the engagement between the first and second gear portions.

Optionally, the second gear portion may at least in part overlap the first gear portion in an axial direction.

The sandwich effect of overmolding the second gear portion around the first gear portion creates a strong and stable bond therebetween, potentially limiting both rotational and axial disassembly of the multi-component gear.

According to a second aspect of the invention, there is provided an actuator comprising a motor and a gear train having at least one multi-component gear in accordance with the first aspect of the invention.

Preferably, the multi-component gear may be a first gear in the gear train with respect to the motor.

A gear will experience the greatest torque on its pinion— the gear wheel will interface with a pinion of the motor of the actuator, turning quickly, whilst the pinion of the gear itself will turn at a slower speed but at high torque when contacting the second stage gear. The first gear in sequence is the part of the gear train which turns the fastest, and therefore is responsible for the greatest acoustic noise. Later gears in sequence may preferably be formed from a harder material, since the slower rotational speed will diminish the generation of acoustic noise.

According to a third aspect of the invention, there is provided a method of forming a gear for an actuator, the method comprising the steps of: a] forming, from a first material, a first gear portion having an engagement head which has a perimeter interface and a gear stem axially extending from the engagement head; and b] overmolding, using a second material which has a lower dynamic hardness than the first material, a second gear portion having a gear body which includes a plurality of gear teeth at a circumference thereof, the gear body being received around the engagement head of the first gear portion.

Overmolding of the second gear portion to the first gear portion provides a way of easily forming a multi-component gear which blends the benefits of hard and soft material components into a single gear.

The engagement head of the first gear portion may include at least one axial member, and during step b] the second material is overmolded into or around the at least one axial member to inhibit axial disassembly.

BRIEF DESCRIPTION OF THE DRAWINGS

The invention will now be more particularly described, by way of example only, with reference to the accompanying drawings, in which:

FIG. 5b shows a bottom perspective representation of the multi-component gear of FIG. 5a.

DETAILED DESCRIPTION

Figure 1:
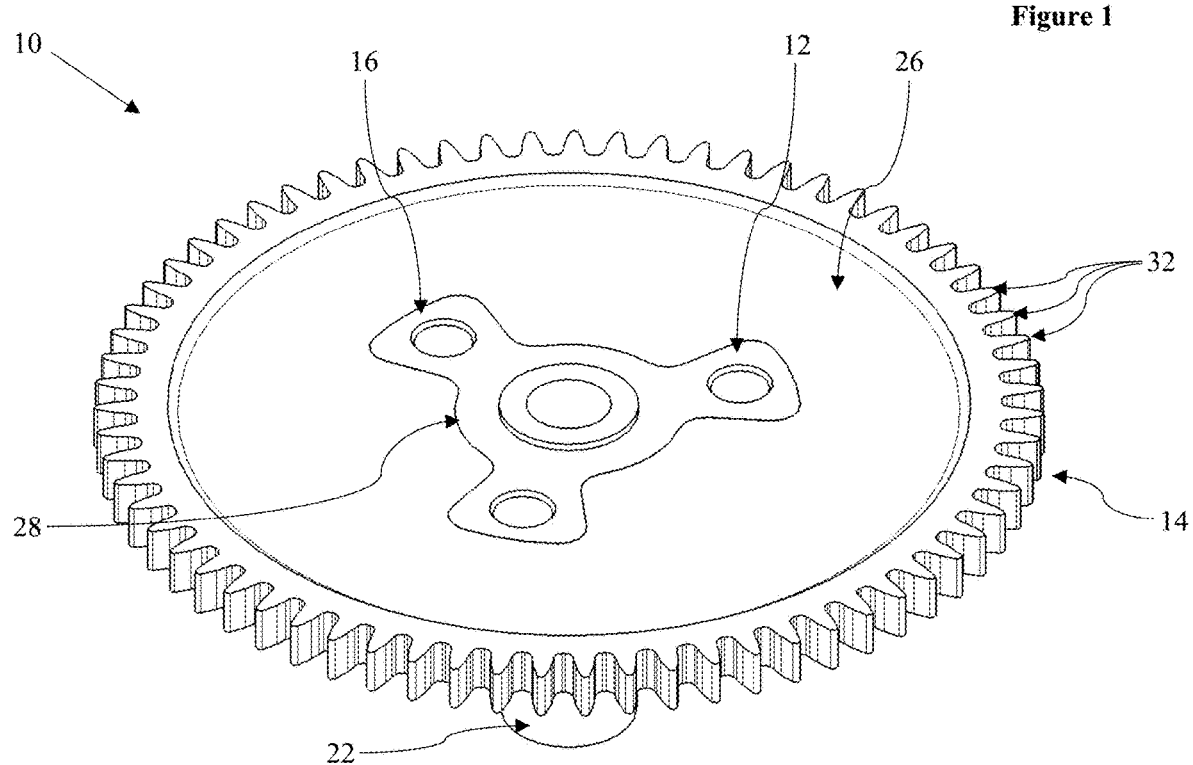
FIG. 1 shows a perspective representation of a first embodiment of a multi-component gear in accordance with the first aspect of the invention.

Referring to FIG. 1, there is indicated a multi-component gear, indicated globally at 10, here formed as a spur gear, though alternative gear shapes or styles could be considered instead.

The multi-component gear 10 comprises first and second gear portions 12, 14 which are interengaged with one another, with the second gear portion 14 being overmolded to the first gear portion 12. The first and second gear portions 12, 14 are formed respectively from first and second different materials, wherein the second material has a lower dynamic hardness, also known as rebound hardness, than the first material.

Figure 2:
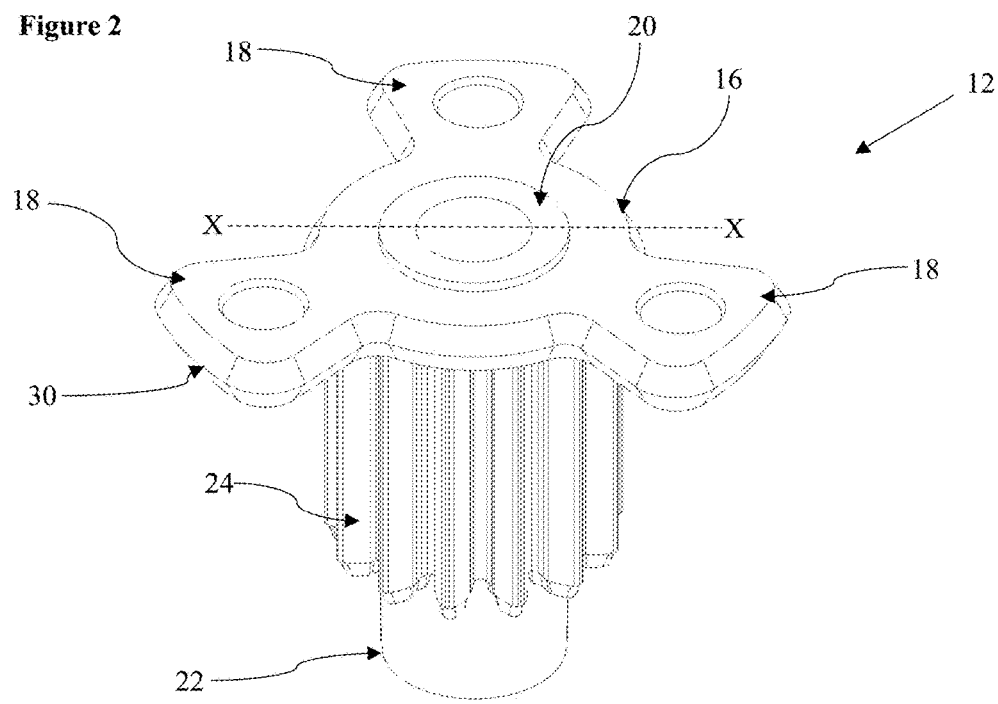
FIG. 2 shows a perspective representation of the first gear portion of the multi-component gear of FIG. 1, with the second gear portion removed.

The first gear portion 12, indicated in isolation in FIG. 2, has an engagement head 16 which preferably has a plurality of radially-extending members 18 which are spaced apart around a central hub 20, which is here hollow to receive a central shaft therethrough. In the present embodiment, the radially-extending members 18 have a divergent blade profile, tapering outwardly from the central hub 20 in the plane of the engagement head 16, and preferably having an extent of at least a quarter of the radius of the second gear portion 14. In other words, the engagement head 16 may have a propeller-like shape. There is also a gear stem 22 which extends axially away from the central hub 20 and which preferably mounts a pinion gear 24. The gear stem 22 here acts as a spacer to correctly position the gear wheel on the central shaft.

Alternative structures of the engagement head 16 may be considered. For example, larger or smaller radially-extending members 18 may be feasible, which may alter the strength of the gear wheel. Alternatively, different geometric shapes could be considered, for example, an octagonal or hexagonal perimeter interface could be substituted for the radially-extending members. Any suitable non-circular interface might be able to create a viable engagement head. For example, recesses and/or indents in the engagement head could add to the non-uniformity of the interface. This further prevents the radial dissociation of the first and second gear portions 12, 14. One exemplary such arrangement is detailed in respect of the second embodiment, outlined below.

The first gear portion 12 is preferably formed as a unitary component from a single piece of material. The material used is a hard material which is resistant to wear or damage under the high torque which will be applied to the pinion gear 24. Examples of such materials include polyamide (PA) or polyoxymethylene (POM).

The selection of an appropriate material for the first gear portion 12 will be based on the strength requirements and resistance to damage of the pinion gear 24, and may be dependent on the actuator with which the multi-part gear 10 is to be used. One indicative measurement of usefulness of the first material is determined by reference to its Shore B hardness value. Suitable materials preferably have a Shore B hardness value in excess of 60.

The second gear portion 14 has a preferably cylindrical or disciform gear body 26 having a central aperture 28 which corresponds with a shape of the engagement head 16, and which matably engages with the perimeter interface 30 of the engagement head 16. The second gear portion 14 forms the main gear wheel of the multi-component gear 10.

At the circumference of the second gear portion 14 is a plurality of gear teeth 32, which are formed as spur gear teeth aligned to the axis of rotation of the multi-component gear 10. It will, however, be appreciated that other gear teeth could feasibly be used, such as bevel gear teeth. Additionally, relatively short teeth are shown, compared to the total radius of the second gear portion 14, but teeth of different lengths, particularly longer teeth, could be considered.

The gear body 26 and the gear teeth 32 may be unitary formed with one another, such that the entire second gear portion is formed from the second material. The second material is chosen so as to reduce the noise of the multi-component gear 10 as it rotates. This is achieved by selecting the second material as a material having a lower dynamic hardness than the first material.

Whilst the relationship between static and dynamic hardness is complex, materials having a Shore A hardness value of between 30 and 90 will have a suitable dynamic hardness which ensures that the plurality of gear teeth 32 are sufficiently resilient to be able to meshingly engage with the gear teeth of an adjacent gear, whilst also retaining sufficient flexibility to reduce the noise created by the impact between the meshing teeth. A thermoplastic elastomeric material might be one example of a suitably flexible material which still remains strong enough to act as gear teeth. It is therefore preferred that the each of the plurality of gear teeth 32 is formed solely from the second material, and do not comprise any hard core which could result in increased noise.

The first and second gear portions 12, 14 are interengaged at the perimeter interface 30 of the engagement head 16. By providing a non-circular perimeter interface 30, there is no risk of dephasing or radial dislocation of the first and second gear portions 12, 14 during rotation of the multi-component gear 10.

Figure 3:
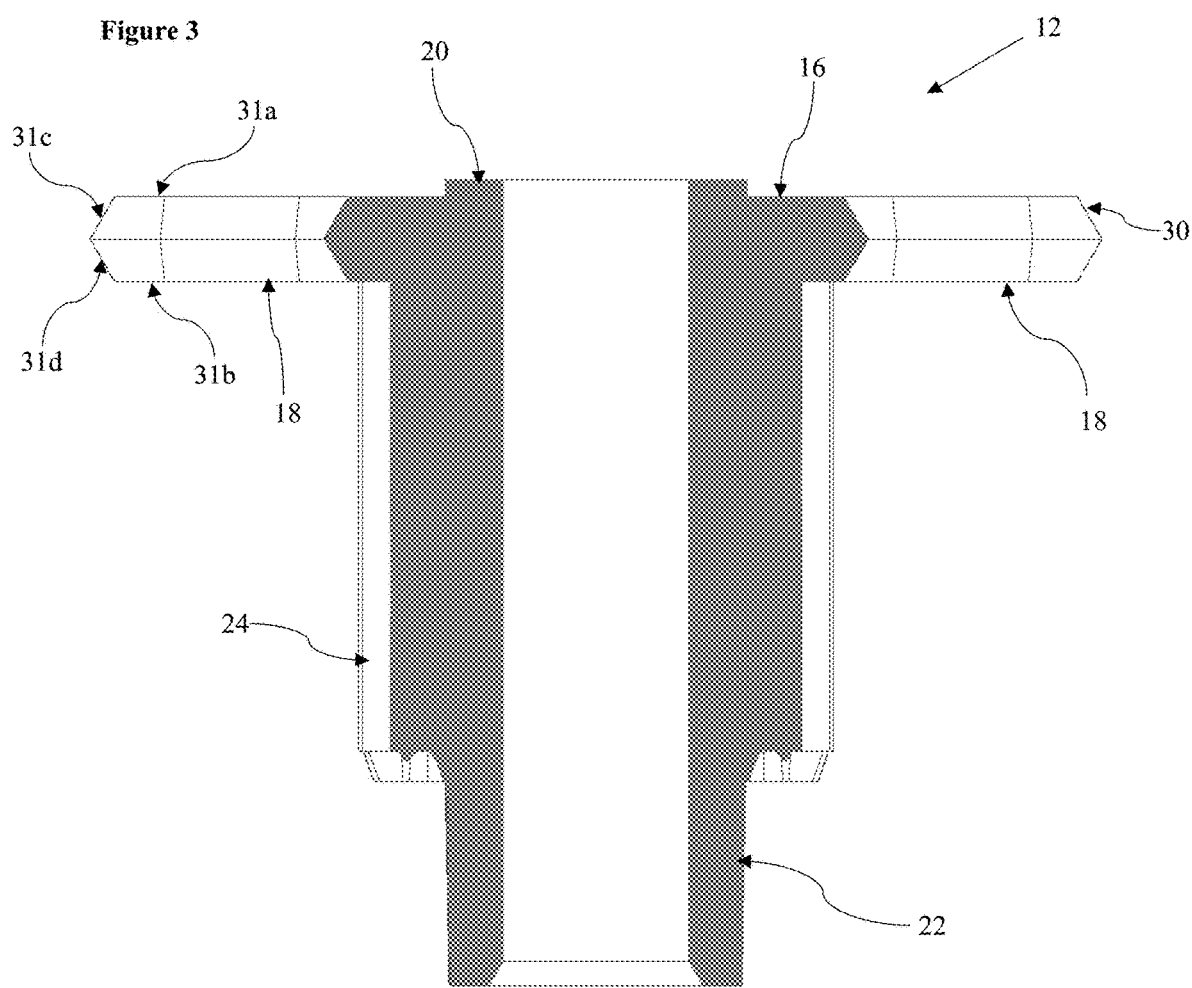
FIG. 3 shows a central vertical cross-section through the first gear portion of FIG. 2 taken along dashed line X-X.

It is also preferred that the perimeter interface 30 of the engagement head 16, that is, the radial-most edge thereof, have a non-uniform extent or cross-section along the axial direction of the gear 10. This can be seen in detail in FIG. 3. In the present arrangement, the perimeter interface 30 tapers outwardly from each of upper and lower surfaces 31a, 31b of the engagement head 16, respectively forming upper and lower edge surfaces 31c, 31d, thereby forming a V- or U-shaped profile along the axial extent of the perimeter interface 30. In other words, a radial wall of the engagement head 16 is provided so as to be multi-faceted, rather than a continuous perimeter wall which is axially aligned.

The perimeter interface 30 can be viewed as a perimeter projection around the entire circumference of the engagement head 16, though discrete projections could instead be provided to provide the axial retention between the first and second gear portions 12, 14.

In any event, the radially-extending members 18 of the engagement head 16 provide a radial retaining means for the multi-component gear 10, whilst the shape of the perimeter interface 30 creates an axial retaining means. The engagement between the first and second gear portions 12, 14 could be purely mechanical, or, depending on the first and second materials used, could also comprise a chemical bond. Ultrasonic bonding, for example, could be utilised to achieve a secure engagement between the first and second gear portions 12, 14.

The aperture 28 of the gear body 26 is complementarily-shaped to the perimeter interface 30, having an inwardly tapering recess which overlaps the perimeter interface 30. This is most readily formed by an overmolding process.

Such a process can be performed by creating a single mold in the form of the multi-component gear 10, into which an insert can be placed to block the part of the mold which forms the second gear portion 14. Such an insert is therefore formed so as to have a shape which matches that of the second gear portion 14. Once the insert is positioned in the mold, the mold can be injected with the first material to form the first gear portion 12.

Once the first gear portion 12 is formed, the insert can be removed or retracted from the mold cavity, and the mold can be injected with the second material so that the second gear portion 14 is overmolded onto the engagement head 16 of the first gear portion 12.

Figure 4:
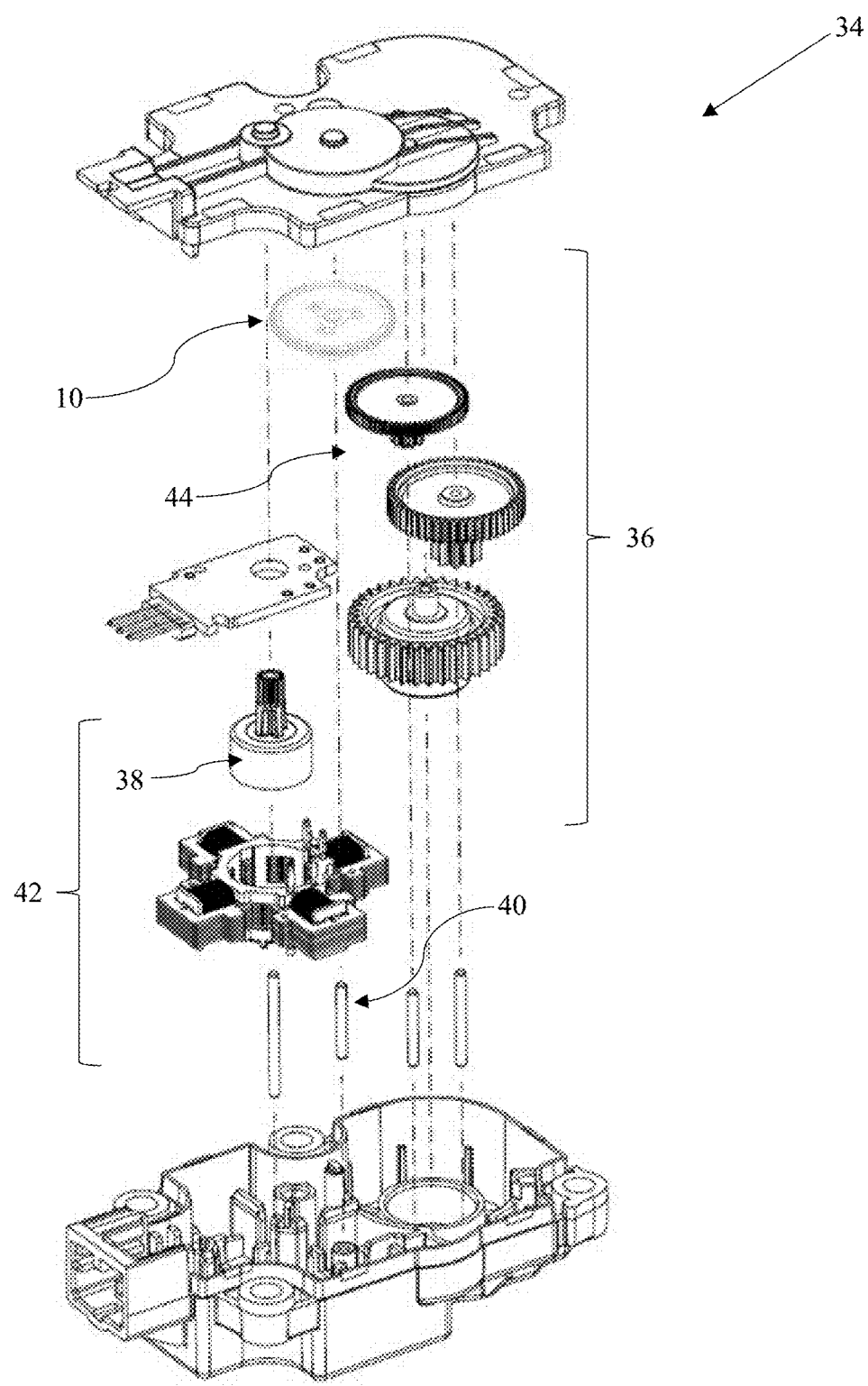
FIG. 4 shows an indicative actuator in which a multi-component gear in accordance with the first aspect of the invention could be used.

An indicative use of the multi-component gear 10 as part of an actuator 34 is shown in FIG. 4. The first gear in the gear train 36 is replaced with the multi-component gear 10 by insertion onto the relevant central shaft 40 in the actuator 34, such that the plurality of gear teeth 32 engage with a drive shaft pinion 38 of the motor 42 of the actuator 34. The pinion gear 24 contacts with the second stage gear 44 of the gear train 36. A high torque is imparted to the pinion gear 24, but the hard first material alleviates issues with breakage which might result from the high torque.

The later stages in the gear train 36 do not rotate as quickly as the first gear in the gear train 36, and therefore less acoustic noise is created. As such, it may be possible to utilise gears of standard construction, for instance, using a single hard material for each gear to improve the wear-resistance thereof. This may reduce the need to adapt existing manufacturing processes for actuators.

Figure 5A:
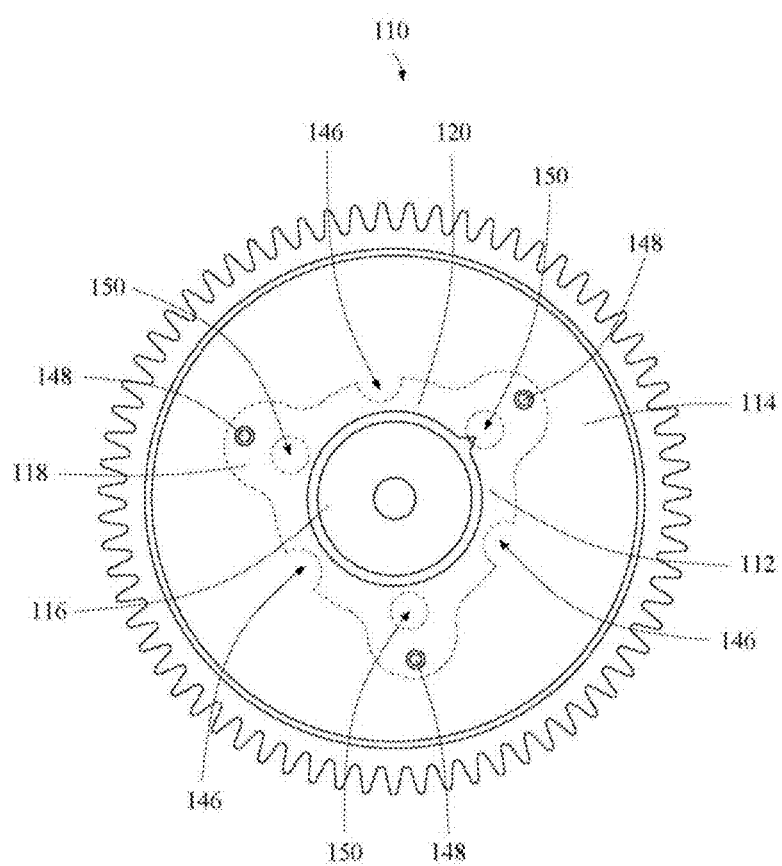
FIG. 5a shows a top perspective representation of a second embodiment of a multi-component gear in accordance with the first aspect of the invention.
Figure 5B:
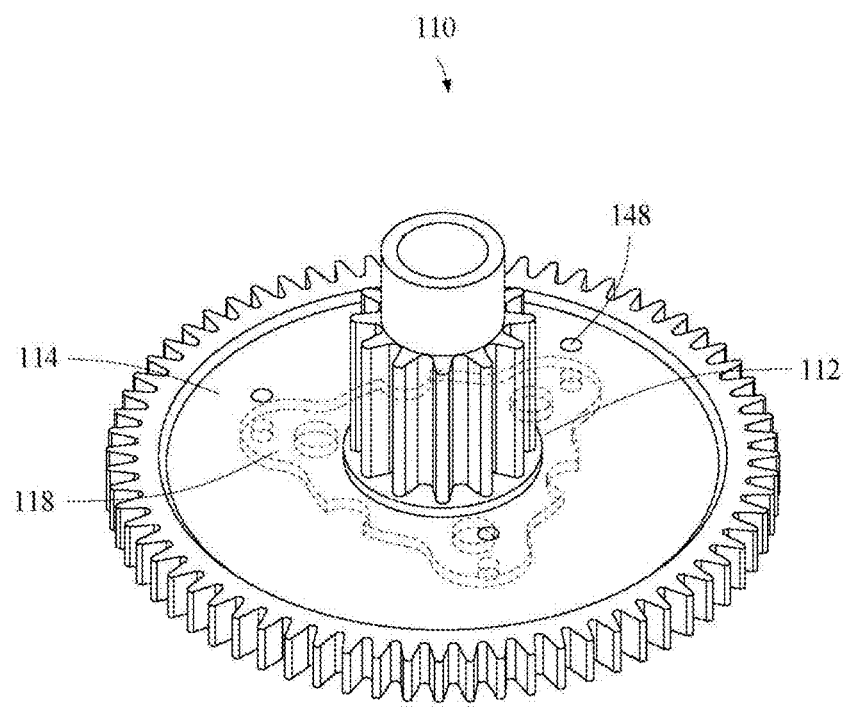

A second embodiment of a multi-component gear is illustrated in FIGS. 5a and 5b, referenced globally at 110. Identical or similar components of the second embodiment will be referenced using identical or similar reference numerals as for the first aspect of the invention, and further detailed description will be omitted for brevity.

In this arrangement, the second gear portion 114 is overmolded to the first gear portion 112. The first gear portion 112 is at least in part thinner in the axial direction than the second gear portion 114, such that the second gear portion 114 at least in part overlaps the first gear portion 112.

The first gear portion 112 has a central hub 120 which extends further in the axial direction than the radially-extending members 118. As such, when the overmolding process occurs, provided that the mold is correctly formed, the radially-extending members 118 are encased within the second gear portion 114.

The first gear portion 112 here retains a suitable geometry to limit dephasing with respect to the second gear portion 114. This is achieved not only by the presence of the radially-extending members 118, formed as rounded radial nubs here, but also by including one or more recesses 146 into which the second material of the second gear portion 112 can flow. This may improve the connection between the first and second gear portions 112, 114.

Where the second gear portion 114 is overmolded to the first gear portion 112 so as to overlap the radially-extending member 118, one or more axial members can be provided to inhibit axial disassembly of the multi-component gear 110. These may be formed as axial projections 148 which extend into or through the second gear portion 114, thereby acting as stabilising legs, or may be formed as wells or recesses 150 into which the second material of the second gear portion 114 may flow during overmolding.

Not only can the axial projections 148 stabilise the engagement between the first and second gear portions 112, 114, but can also assist with the manufacturing process. In the mold, the axial projections can abuttably engage the internal surface of the mold, ensuring that the first gear portion 112 is correctly mounted therein. This prevents tilting, ensuring a uniform injection of polymer resin within the voids on either side of the engagement head 116. The second gear portion 114 can therefore be correctly produced.

It is therefore possible to provide a multi-component gear having first and second gear portions, which is able to improve the wear-resistance of the pinion whilst also reducing the noise produced by the main gear wheel. This is achieved by forming the first and second gear portions, preferably via an overmolding process, from materials having different dynamic hardnesses to one another.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A multi-component gear for an actuator, comprising:
a first gear portion having an engagement head and a gear stem axially extending from the engagement head; and
a second gear portion having a gear body which comprises a plurality of gear teeth at a circumference thereof, the gear body of the second gear portion being received around the engagement head of the first gear portion;
wherein the first gear portion is formed from a first material, and the second gear portion is formed from a second material which has a lower dynamic hardness than the first material;
wherein a perimeter interface of the engagement head is non-circular, and the perimeter interface comprises at least one radial recess engagable with the body of the second gear portion, and the perimeter interface tapers outwardly from each of upper and lower surfaces of the engagement head, respectively forming upper and lower edge surfaces, and the perimeter interface has a V- or U-shaped cross-section along the axial direction of the gear.

2. The multi-component gear as claimed in claim 1, wherein the first gear portion comprises a pinion gear on the gear stem.

3. The multi-component gear as claimed in claim 2, wherein the pinion gear is integrally formed with the gear stem.

4. The multi-component gear as claimed in claim 3, wherein the perimeter interface comprises a plurality of radially-extending members which are engagable with the body of the second gear portion.

5. The multi-component gear as claimed in claim 1, wherein the perimeter interface has a non-uniform cross-section along an axial direction of the gear.

6. The multi-component gear as claimed in claim 1, wherein the first material is a plastics material, and the second material is a different plastics material.

7. The multi-component gear as claimed in claim 1, wherein the first material has a static Shore B hardness of at least 60.

8. The multi-component gear as claimed in claim 1, wherein the first material is a polyamide or polyoxymethylene.

9. The multi-component gear as claimed in claim 1, wherein the second material has a static Shore A hardness of at least 30 and less than 90.

10. The multi-component gear as claimed in claim 1, wherein the second material is a thermoplastic elastomeric materiel.

11. The multi-component gear as claimed in claim 1, wherein the engagement head comprises both axial and radial retaining means for engaging with the second gear portion.

12. The multi-component gear as claimed in claim 1, wherein the multi-component gear is a spur gear.

13. The multi-component gear as claimed in claim 1, wherein the engagement head of the first gear portion comprises at least one axial member engagable with the second gear portion.

14. The multi-component gear as claimed in claim 13, wherein the at least one axial member projects from the engagement head.

15. The multi-component gear as claimed in claim 13, wherein the at least one axial member is formed as a recess in the engagement head.

16. The multi-component gear as claimed in claim 1, wherein the second gear portion at least in part overlaps the first gear portion in an axial direction.

17. An actuator comprising a motor and a gear train having at least one multi-component gear as claimed in claim 1.

18. The actuator as claimed in claim 17, wherein the multi-component gear is a first gear in the gear train with respect to the motor.

19. A method of forming a gear for the actuator in claim 1, the method comprising the steps of:

a] forming, from a first material, a first gear portion having an engagement head which has a perimeter interface and a gear stem axially extending from the engagement head; and b] overmolding, using a second material which has a lower dynamic hardness than the first material, a second gear portion having a gear body which comprises a plurality of gear teeth at a circumference thereof, the gear body of the second gear portion being received around the engagement head of the first gear portion.

20. The method as claimed in claim 19, wherein the engagement head of the first gear portion comprises at least one axial member, and during step b] the second material is overmolded into or around the at least one axial member to inhibit axial disassembly.

* * * * *